(12) United States Patent
Bi et al.

(10) Patent No.: US 9,467,260 B2
(45) Date of Patent: Oct. 11, 2016

(54) METHODS, DEVICES, AND COMPUTER READABLE MEDIA FOR DYNAMIC SCHEDULING

(71) Applicant: Intel IP Corporation, Santa Clara, CA (US)

(72) Inventors: Dongsheng Bi, Fremont, CA (US); Assi Jakoby, Herzelia (IL); Hakan Magnus Eriksson, Munich (DE); Itzik Shahar, Kadima (IL); Ofer Markovits, Haifa (IL); Bruno Jechoux, Antibes (FR); Keren Dor, Herzelyia (IL); Tom Romano, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 49 days.

(21) Appl. No.: 14/497,934

(22) Filed: Sep. 26, 2014

(65) Prior Publication Data
US 2016/0094322 A1    Mar. 31, 2016

(51) Int. Cl.
*H04L 5/00*   (2006.01)
*H04W 88/06*  (2009.01)

(52) U.S. Cl.
CPC ........... *H04L 5/0042* (2013.01); *H04L 5/0094* (2013.01); *H04W 88/06* (2013.01); *H04B 2201/71346* (2013.01); *H04L 5/0062* (2013.01); *H04L 5/0073* (2013.01)

(58) Field of Classification Search
CPC ........... H04W 72/1215; H04W 88/06; H04W 72/082; H04W 72/0446; H04W 72/0406; H04B 1/406; H04B 1/525; H04B 1/0064
See application file for complete search history.

(56) References Cited

U.S. PATENT DOCUMENTS

| 8,494,580 | B1 * | 7/2013 | Weinrib | H04W 16/14 455/11.1 |
| 8,914,019 | B1 * | 12/2014 | Choi | H04W 72/048 455/422.1 |
| 2012/0060158 | A1 * | 3/2012 | Kadous | H04W 72/1215 718/100 |
| 2012/0077532 | A1 * | 3/2012 | Kadous | H04W 16/14 455/507 |
| 2013/0058314 | A1 * | 3/2013 | Broise | H04W 72/1215 370/336 |
| 2013/0072135 | A1 * | 3/2013 | Banerjea | H04B 1/525 455/83 |
| 2014/0140381 | A1 * | 5/2014 | Sang | H04B 1/406 375/219 |
| 2014/0185494 | A1 * | 7/2014 | Yang | H04W 56/0005 370/280 |
| 2014/0328290 | A1 * | 11/2014 | de la Broise | H04W 72/1215 370/329 |

* cited by examiner

*Primary Examiner* — Yee Lam
(74) *Attorney, Agent, or Firm* — Sutherland Asbill & Brennan LLP

(57) ABSTRACT

Methods, devices and systems for dynamic scheduling of Bluetooth signals based at least in part on LTE schedules are disclosed. In some examples, Bluetooth can deduce information on the LTE DL/UL activity based at least in part on the LTE frame structure, LTE decision point or the LTE subframe boundary time. In some examples, Bluetooth scheduler can dynamically change the timing of the scheduling algorithm such that it may utilize the knowledge of LTE traffic and may at least partially avoid interference or evaluate the interference level.

15 Claims, 8 Drawing Sheets

METHODS, DEVICES, AND COMPUTER READABLE MEDIA FOR DYNAMIC SCHEDULING

TECHNICAL FIELD

Exemplary and non-limiting embodiments disclosed herein relate generally to wireless communication systems, methods, devices and, more specifically, relate to scheduling in wireless communication systems and devices.

BACKGROUND

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), time division multiple access (TDMA) systems, frequency division multiple access (FDMA) systems, 3GPP Long Term Evolution (LTE) systems, and orthogonal frequency division multiple access (OFDMA) systems.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two or more of the above may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It should be noted that Bluetooth and some Wireless LAN (WLAN) channels fall within the ISM band, and FIG. 1, for example, illustrates a Bluetooth and an adjacent LTE band. In some instances, a Bluetooth error rate can become unacceptable when LTE is active in some channels of Band 40 or even Band 7 for some Bluetooth channel conditions. Consequently, simultaneous operation with Bluetooth can result in disruption in voice services terminating in a Bluetooth headset. Such disruption may be unacceptable to the consumer.

With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
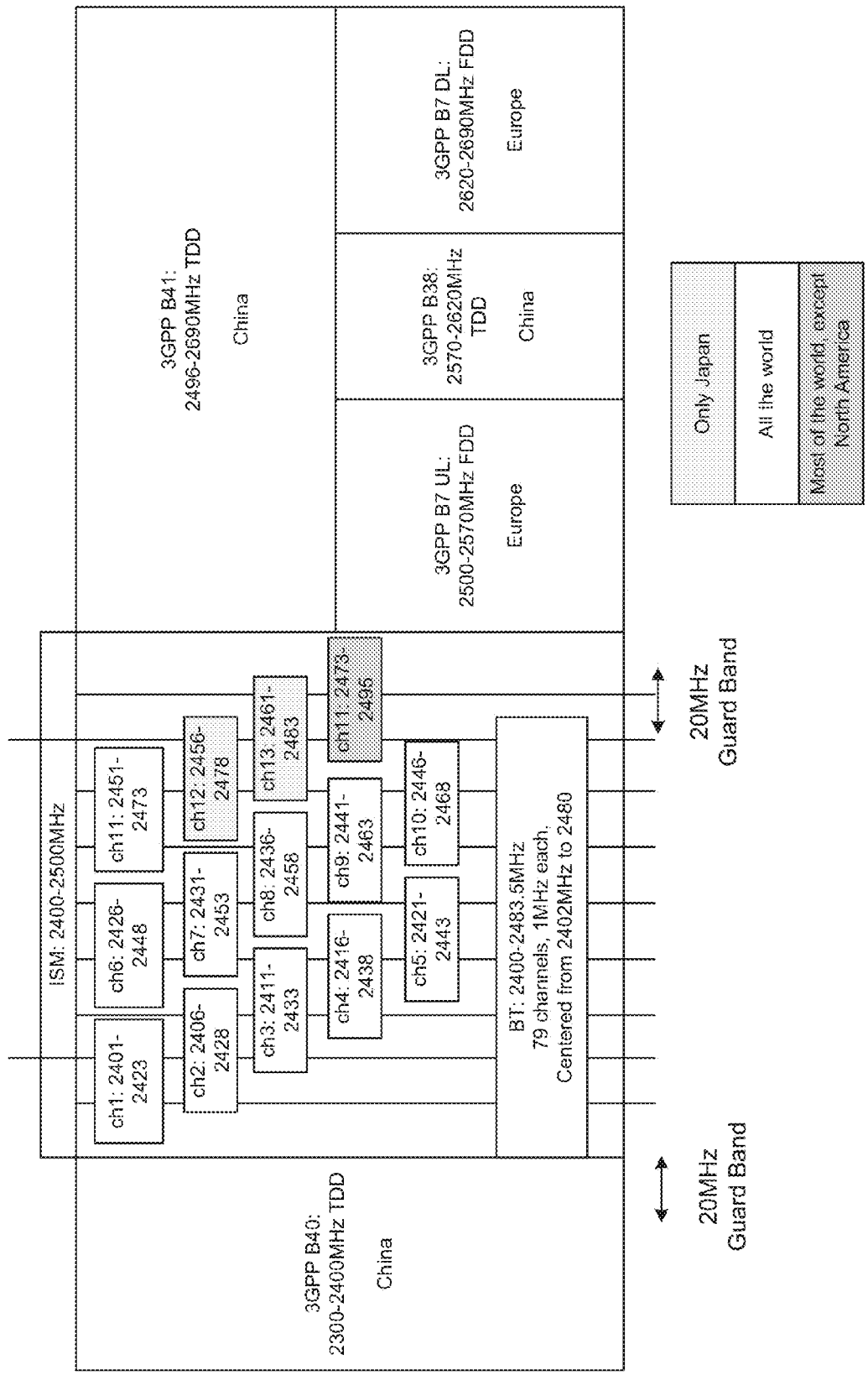
FIG. 1 illustrates an example of a Bluetooth band and an adjacent LTE band.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

It should be noted that LTE has two variants; Time-Division Duplex (TDD) and Frequency-Division Duplex (FDD). In one instance, where a LTE TDD and Bluetooth are coexistent, the Bluetooth transmission (Tx) may affect LTE downlink (DL) and LTE uplink (UL) may affect Bluetooth reception (Rx). In yet another instance, where a LTE FDD and Bluetooth are coexistent, LTE uplink (UL) may affect Bluetooth Rx, for example.

In order to manage communication via multiple radios and avoid collisions and/or interference between respective radios, a dynamic scheduling means can be utilized to coordinate between respective radios that are in collision (e.g., radios configured such that their mutual operation would cause significant interference on at least one of the radios).

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 2:
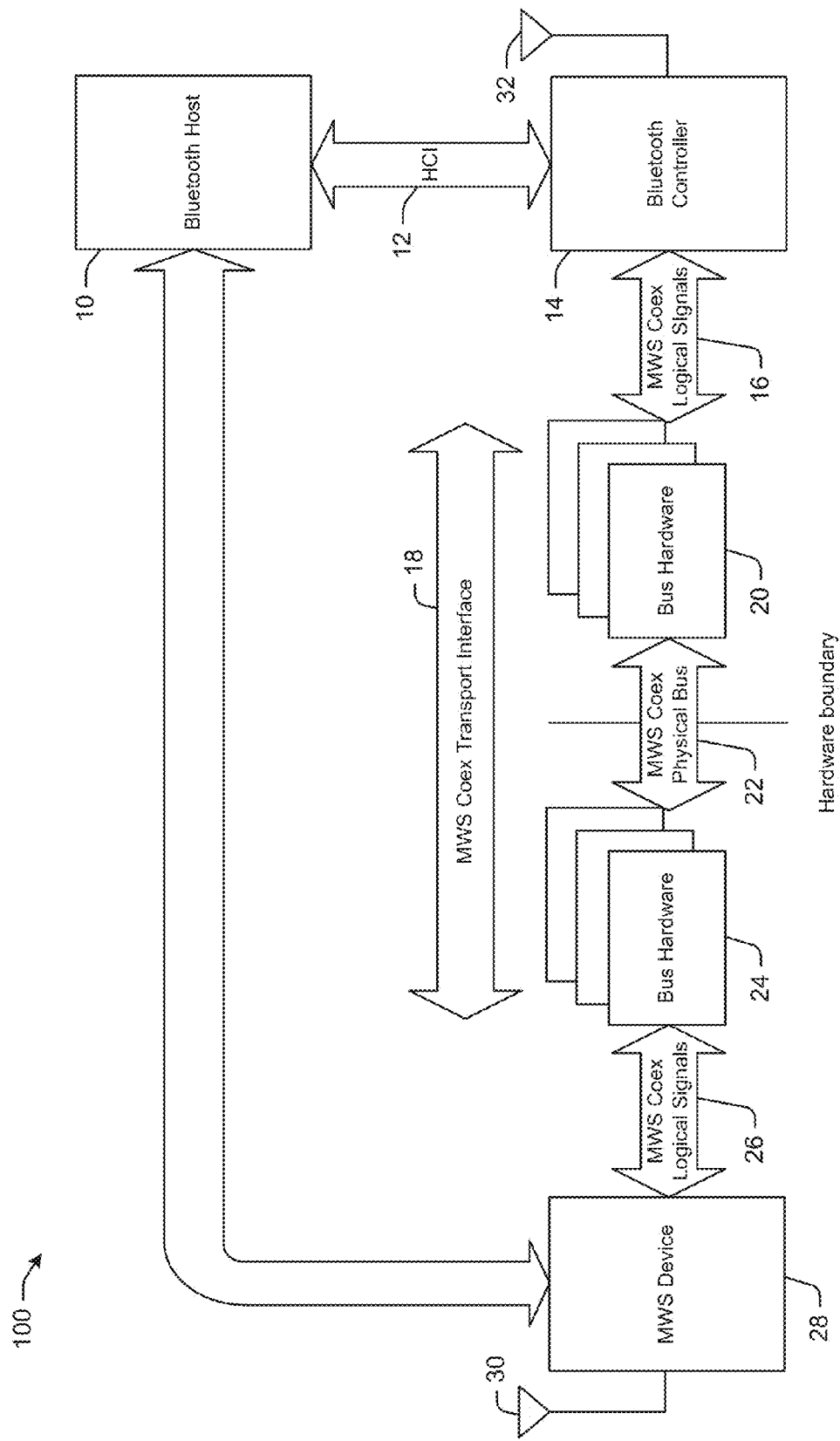
FIG. 2 illustrates architecture of a wireless communication device, according to one exemplary embodiment.

Turning now to FIG. 2, FIG. 2 illustrates an example embodiment of a wireless communication device 100, according to one aspect of the present disclosure. Device 100 may have the illustrated infrastructure to facilitate a coexistence case including a Mobile Wireless Standards radio 30, such as for example a LTE radio, and a Bluetooth radio 32, for example. The collocated Mobile Wireless Standards device 28 and the Bluetooth device or controller 14 may be configured to exchange one or more real time (RT) traffic messages through a Mobile Wireless Standards (MWS) Coex Physical Bus interface 22, for example. One or more messages, as described herein, may include a LTE Tx or a LTE Rx or LTE frame information, which may be transferred from LTE or MWS device 28 to a connectivity chip, for example. According to one or more example embodiments, Bluetooth controller 14 may be configured to indicate high priority traffic to the LTE or MWS device 28 and expect LTE or MWS device 28 to yield in a MWS Coex Transport interface 18 in order to avoid conflicts. However, in the case of a Non Real Time (NRT) interface, the messages may be routed through a Bluetooth host interface 10 where status information, such as for example LTE operation band and channels, may be exchanged. Wireless communication device 100 may also include bus hardware 20 to enable communication of MWS Coex logical signals 16 between the devices 14, 28 and the MWS Coex physical bus 20, for example. Additionally, wireless communication device 100 may include a Host Controller Interface (HCI) architecture, wherein a HCI 12 may enable communication between the Bluetooth host 10 and the Bluetooth controller 14, as shown in FIG. 2, for example. The HCI 12 may, for example, provide a command interface to the baseband controller 14 and Bluetooth host 10, access to configuration parameters, and a uniform method of accessing the Bluetooth baseband capabilities.

The standard interface described above may allow the Mobile Wireless Standards device 28 and the Bluetooth device or controller 14 to exchange information and support cooperative coexistence. However, due to network restriction of the LTE system, in the event there is a conflict or arbitration between the two devices, for example when one device is attempting to send a signal during the reception period of the other device, the system may lean towards the LTE device. Collisions can occur when one interface or device receives a packet while another collocated interface or device is transmitting. Collisions may produce one or more bit errors in the received packet data, corrupted data and packet loss. As such, in a typical scenario, less than 10% of LTE traffic is affected and whenever there is interference between the two devices, Bluetooth device is most likely to be the victim. For example, either the Bluetooth Tx is killed or the Bluetooth Rx gets affected. This may result in, for example, performance degradation due to the wireless communication device 100 attempting multiple retransmissions.

According to one or more example embodiments of the present disclosure, the LTE or MWS device 28 may provide information on its Downlink (DL) and Uplink (UL) activity in advance and may be synchronized with the LTE subframe boundaries DL/UL respectively. The decision point of whether to use the subframe may be done at a fixed time location relative to the subframe boundary. By using the LTE decision point knowledge and knowing the subframe boundary, and LTE frame structure, Bluetooth device 14 may be able to deduce better futuristic information in advance notice time in comparison to the one achieved by only using the knowledge of LTE frame subframe and LTE UL/DL advance indications.

LTE UE may schedule its RF traffic according to eNB's assignments. It may have the knowledge ahead of the actual transmissions, for example. The LTE device may notify its actual traffic with known offsets to other radio devices in the same system, for example. As described herein, the LTE decision point may be a notification point when the LTE device may convey messages, if the traffic state changes, for example. LTE may convey a signal to connectivity chip on the upcoming Tx and Rx traffic, if there is a change. Since the messages only reflect changes, the messages may not be communicated at every notification point.

According to one example embodiment, when LTE device or interface 28 reports its UL and DL activity to the connectivity chip over the RT coexistence interface 18, BT device or interface 14 knows if currently the LTE is in DL or UL and can also calculate internally when a change is expected to happen, for example. The futuristic information can be deduced by the connectivity chip using current information, such as for example, the LTE frame structure (TDD). The LTE frame structure may be semi-static and may be conveyed over a Non Real time (NRT) coexistence interface. However, the LTE subframe time may be fixed, such as for example 1 msec. There may be exceptions in TDD special subframes where the LTE Downlink Pilot Time Slot (DwPTS), Guard Period (GP), or Uplink Pilot Time Slot (UpPTS) times may be fixed, however, may be less than 1 msec.

Futuristic information may also be deduced by the connectivity chip using information, such as for example, LTE DL/UL frame and subframe boundaries information. According to this embodiment, the LTE frame start may be conveyed by the LTE or MWS device 28 to the connectivity chip over the Real Time (RT) coexistence interface 18. LTE subframe boundary may be tracked by the connectivity chip by tracking the time changes of the LTE DL/UL indication over RT coexistence interface 18 and by knowing the subframe time is 1 msec.

According to another example embodiment, futuristic information may be deduced by the connectivity chip using information, such as for example, the LTE decision point or reporting time to the connectivity chip wherein the LTE DL/UL activity reporting point is fixed relative to the subframe boundary. One or more messages transmitted from the LTE or MWS device 28 to the Bluetooth device 14 may carry both static or semi-static traffic information as well as spontaneous traffic information. Static or semi-static information may include, for example, LTE frame structure, LTE traffic pattern and LTE inactivity durations. Together with the Real time signaling of frame_sync, the connectivity chip can derive when some of the traffic may not happen. For example, frame structure message may be able to tell when the UL or the DL will not be happening, and the inactivity duration can indicate the period during which there is no UL and DL. For spontaneous traffic information, such as LTE DL/UL activity, the LTE or MWS device 28 may typically notify the connectivity side with advance signaling, i.e., the reporting time related to air time may be fixed. The fixed offsets may be conveyed through NRT interface, for example, using MWS_Rx_Assert_Offset and MWS_Tx_Assert_Offset etc.

Figure 3:
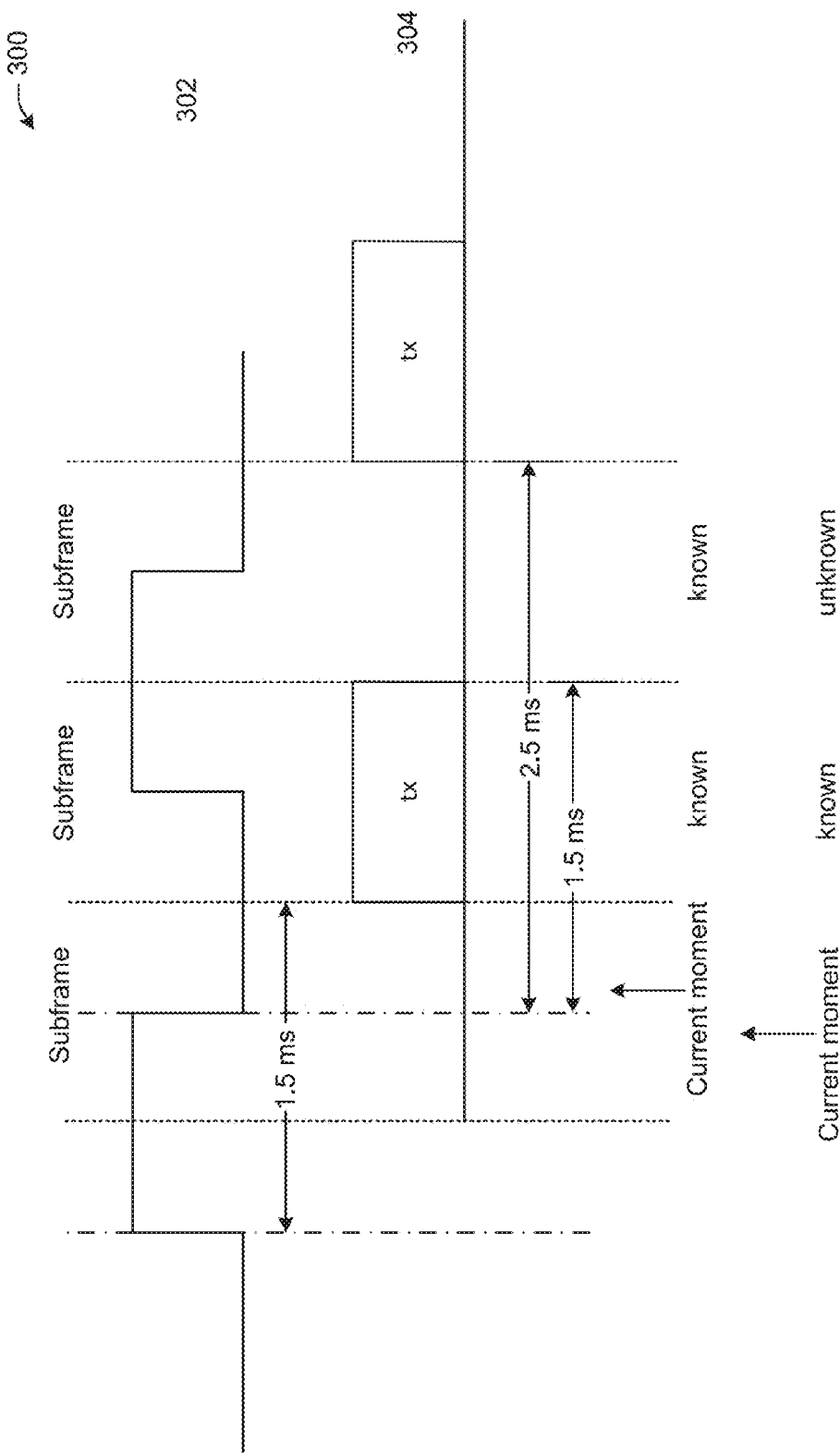
FIG. 3 illustrates an example of a method for processing MWS signals, according to one exemplary embodiment.

Turning now to FIG. 3, FIG. 3 illustrates a method 300 for implementing fixed reporting time scheme by the LTE or MWS device to increase its visibility, according to one or more example embodiments of the present disclosure. Depending on the current moment related to the scheduled LTE reporting time, the visibility of future traffic can be different. For example, if the MWS_Tx 302 offset is 1.5 ms, which means it will be asserted 1.5 ms ahead of actual Tx signal at air 304, depending on the relative current timing in the subframe (LTE subframe is fixed 1ms), the Bluetooth device or interface can know the future events up to 2.5 ms (or at least 1.5 ms). Each Bluetooth frame can typically be 1.25 ms, and so the extra 1.25 ms could be beneficial for the Bluetooth device or interface in scheduling.

Figure 4:
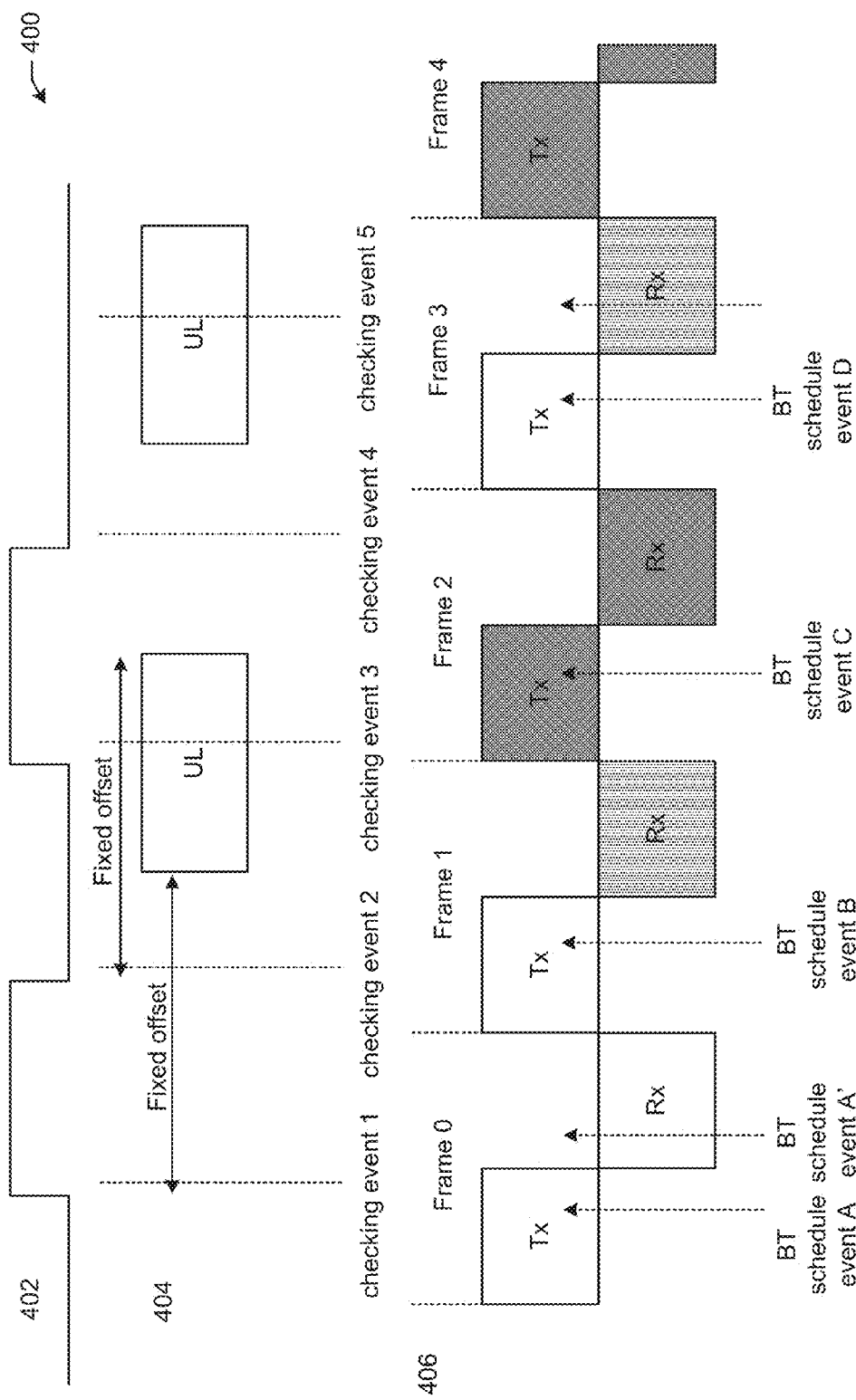
FIG. 4 illustrates an example of a method for dynamic scheduling of Bluetooth signals, according to one exemplary embodiment.

As described in the above example embodiments, Bluetooth device or interface 14 can have more visibility of LTE traffic right after the LTE traffic reporting time, and this can be applicable to both UL and DL traffics. By moving around the scheduling time, Bluetooth device or interface 14 can better utilize the air interface, according to one example of the present disclosure. For example, as shown in FIG. 4, at Bluetooth schedule event A, the Bluetooth controller 14 does not have good visibility whether frame 1 is free of interference or not. However, if the scheduler delays the scheduling after checking event 1, for example to schedule event A', then the Bluetooth controller 14 may be able to identify interference in frame 1 slot, according to one example embodiment of the disclosure. In order to enable flexible traffic, Bluetooth controller 14 can avoid the conflict and schedule it on a free slot, for example frame 2, that has no interference as visible from the current point. Similarly, Bluetooth schedule event B may be moved to a later point to identify that Frame 4 is an available free slot with no interference. As it may be apparent to one of skills in the art, the MWS_Tx signal 402 and MWS traffic at air signal 404 are shown along the same time line as Bluetooth signal 406 in order to illustrate the scheduling of events by the LTE device or interface 28 and the Bluetooth controller 14.

Checking events, as described herein, are self-generated events. At the time of checking events, the latest RT messages should have arrived and been processed, if there are any, and the system would have the most visibility, for example. Checking events take into account, for example, frame structure, jittering of the interface, etc.

Figure 5:
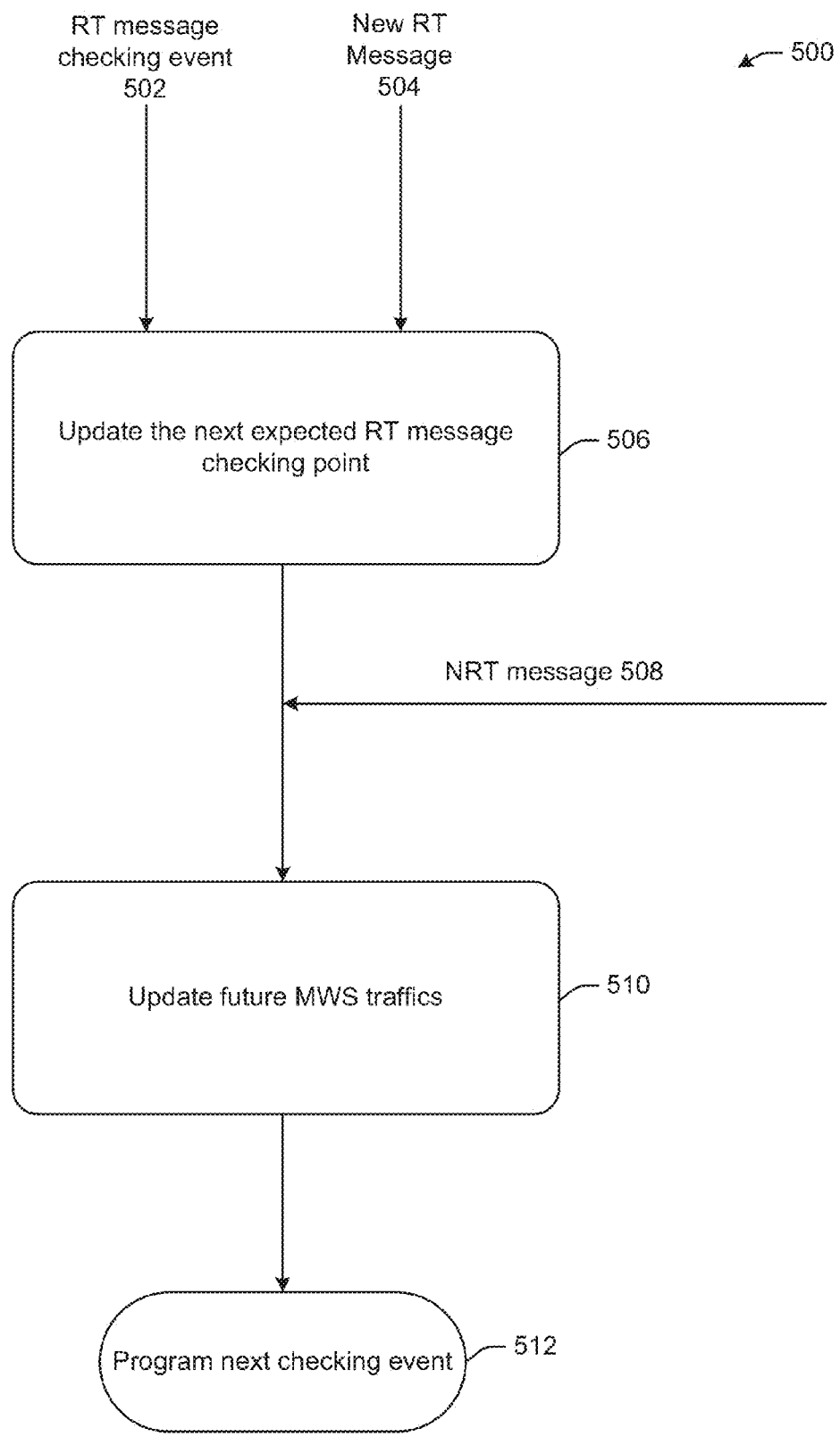
FIG. 5 illustrates steps involved in a method for processing LTE signals, according to one exemplary embodiment.

FIG. 5 is an example of a flow diagram illustrating a method for processing LTE traffic, according to one or more example embodiments of the present disclosure. As illustrated therein, the LTE device or interface updates the LTE traffic information based at least in part on NRT messages as well as RT messages. For example, in step 506 the LTE device or interface schedules a checking event based at least in part on RT message 502, receives any new RT message(s) 504, and updates the next expected RT message checking point. At step 510, the LTE device or interface receives any NRT message(s) 508 and updates future MWS or LTE traffic based at least in part on the current information. At step 512, the LTE device or interface programs the next checking event for a RT message or NRT message.

Figure 6:
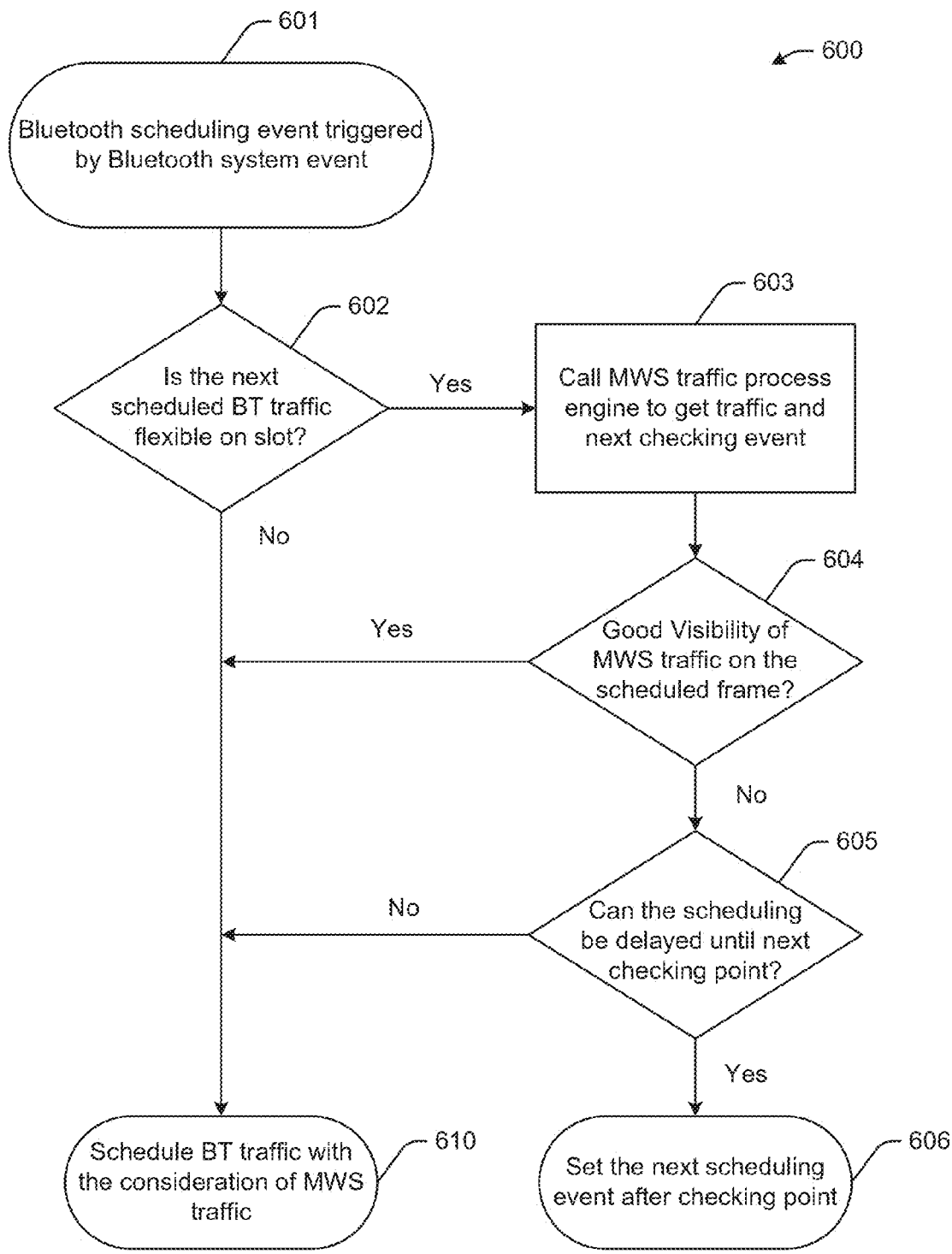
FIG. 6 illustrates steps involved in a method for dynamic scheduling of Bluetooth signals, according to one exemplary embodiment.

Turning now to FIG. 6, FIG. 6 is an example of a flow diagram illustrating steps involved in dynamic Bluetooth scheduling method 600, according to one or more example embodiments. The method 600 may be stored on a non-transitory computer readable medium and may be executed by a processor within the wireless communication device described in various embodiments disclosed herein. For example, for every Bluetooth scheduling event according to example embodiments described herein, the Bluetooth device or interface may first check if the Bluetooth traffic is flexible, and if it is flexible, then the Bluetooth device or interface may check against LTE traffic to see if there is a conflict. If there is no visibility and the Bluetooth scheduler can afford to delay the Bluetooth signal until the next checking point, then the Bluetooth device or interface can retrigger the scheduling after the next checking point. By dynamically changing the scheduling time, the Bluetooth device or interface can avoid conflict and save device power.

For example, in step 601 of method 600, the Bluetooth scheduling event may be triggered by the Bluetooth system event. At step 602, the Bluetooth device or interface may make a determination as to whether or not the next scheduled Bluetooth traffic is flexible on the next slot. If it is determined that the Bluetooth traffic is flexible, then in step 603, the Bluetooth device or interface calls MWS or LTE traffic process engine, as shown in FIG. 5 for example, to get traffic information and next checking event. However, if it is determined that the next scheduled Bluetooth traffic is not flexible on the next slot, then the Bluetooth device or interface schedules Bluetooth traffic in step 610 by taking into consideration the MWS traffic. In step 604, the Bluetooth device or interface determines if there is good visibility of the MWS or LTE traffic on the scheduled frame, and if there is good visibility of the MWS or LTE traffic on the scheduled frame, then the Bluetooth device or interface schedules Bluetooth traffic in step 610 by taking into consideration the MWS traffic. However, if the Bluetooth device or interface determines that there is no good visibility of the MWS or LTE traffic on the scheduled frame, then the Bluetooth device or interface checks whether the scheduling can be delayed until the next checking point in step 605. If the answer is yes, then the Bluetooth device or interface sets the next scheduling event after the checking point. However, if the scheduling cannot be delayed until the next checking point, then the Bluetooth device or interface schedules Bluetooth traffic in step 610 by taking into consideration the MWS traffic.

Consequently, the Bluetooth device or interface as disclosed herein can deduce additional futuristic information on the LTE DL/UL activity basing the deduction on LTE frame structure, LTE decision point (reporting time to connectivity chip), and the LTE subframe boundary time. The Bluetooth scheduler, as disclosed in various embodiments herein, can dynamically change when to trigger scheduling algorithm such that fully utilizes the knowledge of LTE future traffic to avoid the interference or evaluate the interference level. Accordingly, by dynamically changing the Bluetooth scheduling time, the exemplary systems, methods, and devices disclosed herein can optimize the flexible Bluetooth traffic to avoid collision with any interfering LTE air traffic. The systems, methods, and devices disclosed herein can therefore enhance the performance and save power consumption.

Figure 7:
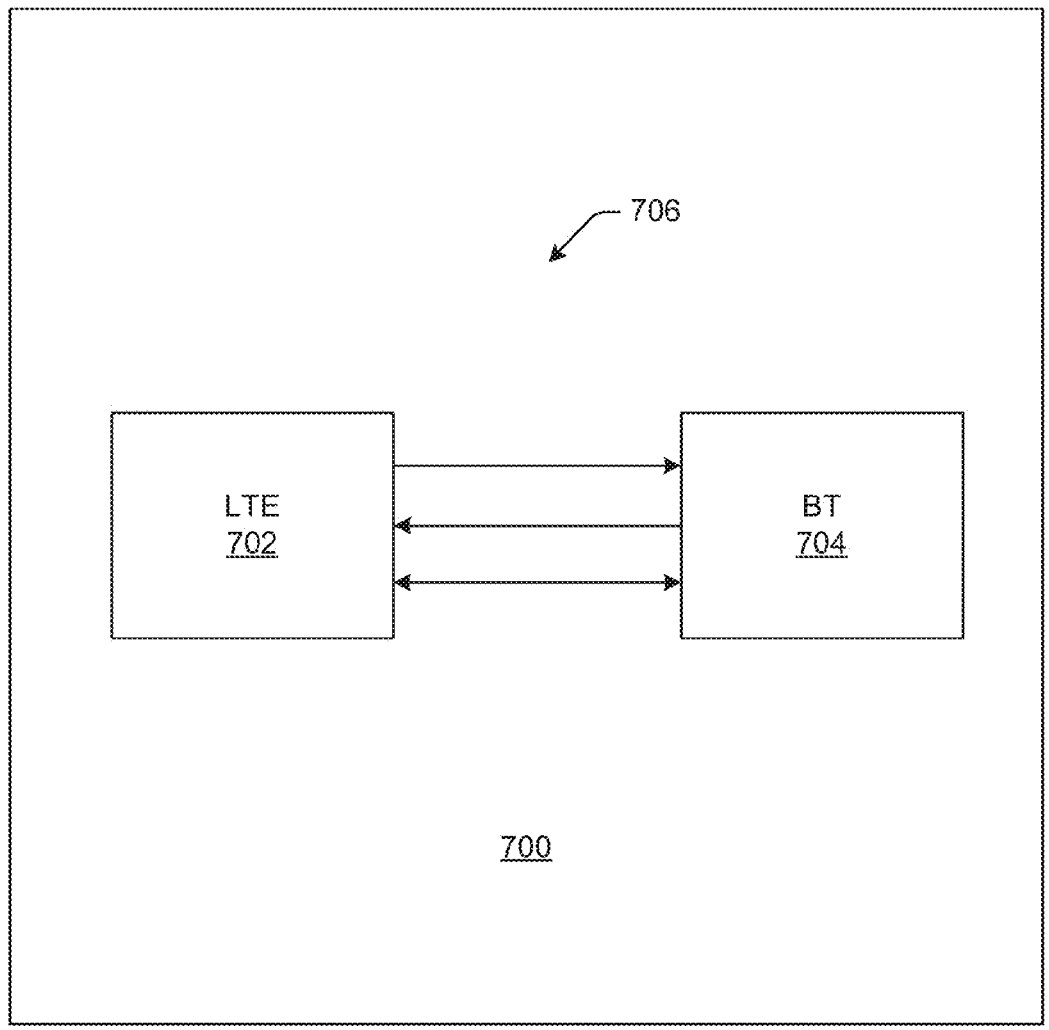
FIG. 7 illustrates an example of a wireless communication device, according to one exemplary embodiment.

Referring to FIG. 7, shown is an example of a wireless communication device (or platform) 700 such as, for example a smart phone, a tablet, a phablet, a personal digital assistant, or other computing device that includes a cellular interface (or device) such as, e.g., LTE interface 702 collocated with a Bluetooth interface (or device) 704, according to one or more example embodiments of the present disclosure. The cellular interface (or device) can include processing circuitry capable of supporting cellular communications such as, e.g., LTE, 2G, 3G, 4G, or other cellular communication protocols. For example, the LTE interface 702 may include processing circuitry for one or more cellular transceiver(s) to support LTE communications. The Bluetooth interface (or device) 704 may include processing circuitry for one or more transceiver(s) to support Bluetooth communications. The communication device 700 may also include additional and/or combined interfaces (or devices) including processing circuitry to support other wireless communications such as, e.g., WLAN, WiMAX, global positioning system (GPS), near field communication (NFC), Neighborhood Area Network (NaN), etc.

In one or more embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions.

High speed signaling 706 may be provided between the LTE and Bluetooth interfaces (or devices) 702 and 704. Signaling may also be provided between the other interfaces (or devices) to allow for communications. Examples of the high speed signaling include an LTE frame synchronization (frame_synch) signal that indicates the frame synchronization with the base station, an LTE transmit (Tx) signal that indicates when the LTE interface 702 is or will be transmitting, LTE frame configuration information (e.g., config 0, config 1, config 2, etc.), and other signals and/or information. In some embodiments, the LTE and Bluetooth interfaces 702 and 704 may communicate with each other through, e.g., a two-wire bit pipe interface. The bit pipe interface may be a two-wire high speed universal asynchronous receiver/transmitter (HS_UART) with a baud rate of, e.g., 4 Mbps. Temperature and other operational conditions may also be communicated between the LTE and Bluetooth interfaces.

By knowing which LTE frame configuration being used and the LTE frame synchronization, the possibility of collisions between Bluetooth Rx and collocated LTE Tx can be deterministic. In some embodiments, the transmission power of the LTE interface (or device) 702 may be reduced during an LTE UL period to lower the bit error rate (BER) of Bluetooth packets that are received during the LTE UL period. For example, a 3 dB reduction may be possible when the LTE interface 702 is operating close to a base station. The Bluetooth interface 704 may send a request to the LTE interface 702 requesting a reduction in power during a specified time period. The request may specify, e.g., a time period based at least in part upon the LTE frame synchronization, corresponding to a LTE UL period, or corresponding to a Bluetooth frame or period. The request may also indicate a requested power reduction. The reduced LTE Tx power may allow the Bluetooth interface to receive packets during that time period with a lower BER. If the operational conditions permit, the LTE interface 702 may reduce the Tx power as requested or may adjust the Tx power to a level that does not impede LTE communications. The LTE interface may confirm the reduction or adjustment to the Bluetooth interface.

Figure 8:
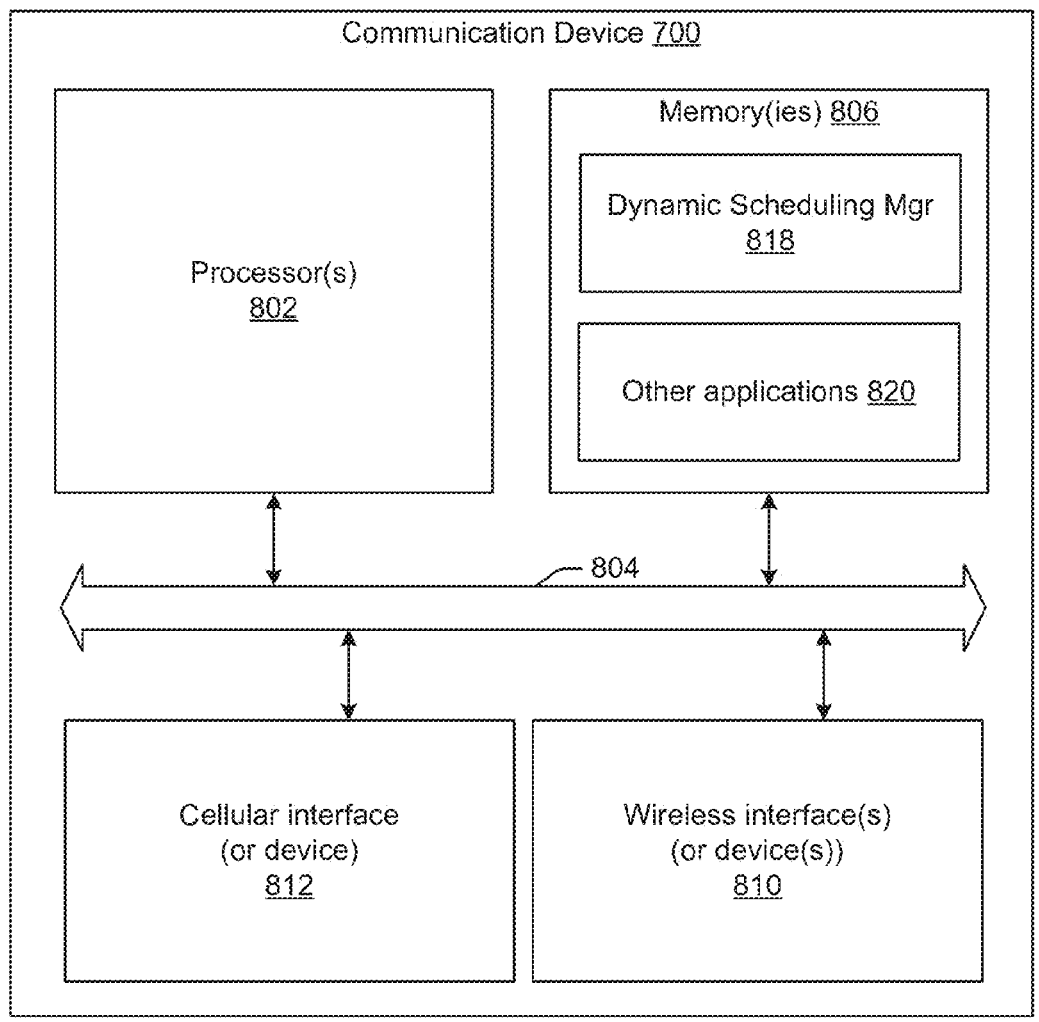
FIG. 8 illustrates an example of a wireless communication device, according to one exemplary embodiment.

Turning now to FIG. 8, shown is a schematic block diagram of the wireless communication device 700 (shown in FIG. 7) in accordance with various embodiments of the present disclosure. The communication device 700 includes at least one processor circuit, for example, having a processor 802 and a memory 806, both of which are coupled to a local interface 804. The communication device 700 may include a cellular interface (or device) 812 such as, e.g., the LTE interface (or device) 702 of FIG. 7 and one or more wireless interface (or device) 810 including, e.g., the Bluetooth interface (or device) 704 of FIG. 7, all of which may be coupled to the local interface 804. The cellular interface (or device) 812 comprises processing circuitry for supporting cellular communications such as, e.g., LTE, 2G, 3G, 4G, WiMAX, WCDMA, HSDPA, WLAN or other wireless communication protocols. The wireless interface(s) (or device(s)) 810 comprise processing circuitry for supporting wireless communications such as, e.g., Bluetooth (Bluetooth), IEEE 802.11a/b/g/n, near field communication (NFC), global positioning system (GPS)/global navigation satellite system (GNSS), neighborhood area network (NaN) and/or other wireless communication protocols.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the cellular interface (or device) 812 and/or wireless interface(s) (or device (s)) 810 may be implemented by processor 802 via local interface 804. The local interface 804 may comprise, for example, a data bus with an accompanying address/control bus or other bus structure as can be appreciated.

Stored in the memory 806 are both data and several components that are executable by the processor 802 and/or by processing circuitry of the cellular interface (or device) 812 and/or wireless interface(s) (or device(s)) 810. In particular, stored in the memory 806 and executable by the processor 802 may be a dynamic scheduling manager 818, and one or more other applications 820. In addition, an operating system may be stored in the memory 806 and executable by the processor 802. In some embodiments, the cellular interface (or device) 812 and/or wireless interface(s) (or device(s)) 810 may include memory for storing the dynamic scheduling manager 818. In some cases, the processor 802 and memory 806 may be integrated as a system-on-a-chip.

It is understood that there may be other applications that are stored in the memory and are executable by the processor 802, the cellular interface (or device) 812 and/or wireless interface(s) (or device(s)) 810 as can be appreciated. A number of software components may be stored in the memory and executable by the processor 802, the cellular interface (or device) 812 and/or wireless interface(s) (or device(s)) 810. In this respect, the term "executable" means a program file that is in a form that can ultimately be run by the processor 802, the cellular interface (or device) 812 and/or wireless interface(s) (or device(s)) 810. Examples of executable programs may be, for example, a compiled program that can be translated into machine code in a format that can be loaded into a random access portion of the memory 806 and run by the processor 802, source code that may be expressed in proper format such as object code that is capable of being loaded into a random access portion of the memory 806 and executed by the processor 802, or source code that may be interpreted by another executable program to generate instructions in a random access portion of the memory 806 to be executed by the processor 802, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 802 may represent multiple processors 802 and the memory 806 may represent multiple memories 806 that operate in parallel processing circuits, respectively. In such a case, the local interface 804 may be an appropriate network that facilitates communication between any two of the multiple processors 802, between any processor 802 and any of the memories 806, or between any two of the memories 806, etc. The local interface 804 may comprise additional systems designed to coordinate this communication, including, for example, performing load balancing. The processor 802 may be of electrical or of some other available construction.

Although the dynamic scheduling manager 818, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Based on the foregoing it should be apparent that the exemplary embodiments of this disclosure provide a method, apparatus and computer program(s) to provide enhanced in-device coexistence for a user device that operates with a cellular network, such as the LTE network.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Although the flowchart of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dynamic scheduling manager 818 that comprises software or code can be embodied in any non-transitory computer-readable medium for use by or in connection with an instruction execution system such as, for example, a processor 802 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Examples

One example embodiment relates to a method for dynamic Bluetooth scheduling, the method including the steps of determining, by a Bluetooth device or interface, flexibility of a Bluetooth signal, receiving, by the Bluetooth device or interface, from a LTE device or interface, LTE information including information relating to a LTE frame structure, a LTE Downlink or Uplink frame or subframe boundary, or a LTE decision point, and scheduling, based at least in part on the LTE information, the Bluetooth signal. The LTE information may include information relating to a LTE frame structure, a LTE Downlink or Uplink frame or subframe boundary, a LTE inactivity duration, and a LTE decision point. The Bluetooth device or interface and the LTE device or interface may communicate via a Mobile Wireless Standards (MWS) Coex transport interface. The LTE information may include Real Time (RT) and Non Real Time (NRT) messages. The LTE frame structure may be semi-static and the information relating to the LTE frame structure may be conveyed over a NRT coexistence interface. The information relating to the LTE Downlink or Uplink frame or subframe boundary may be conveyed over a RT coexistence interface. The LTE decision point may be fixed relative to the subframe boundary.

Another example embodiment relates to a wireless communication device including a Bluetooth device or interface for sending and receiving one or more Bluetooth signals, and a LTE device or interface for sending and receiving one or more LTE signals, the Bluetooth device or interface configured to receive, from the LTE device or interface, LTE information including information relating to a LTE frame structure, a LTE Downlink or Uplink frame or subframe boundary, or a LTE decision point, and scheduling the one or more Bluetooth signals based at least in part on the LTE information. The LTE information may include information relating to a LTE frame structure, a LTE Downlink or Uplink frame or subframe boundary, a LTE inactivity duration, and a LTE decision point. The Bluetooth device or interface and the LTE device or interface may communicate via a Mobile Wireless Standards (MWS) Coex transport interface. The LTE information may include Real Time (RT) and Non Real Time (NRT) messages. The LTE frame structure may be semi-static and the information relating to the LTE frame structure may be conveyed over a NRT coexistence interface. The information relating to the LTE Downlink or Uplink frame or subframe boundary may be conveyed over a RT coexistence interface. The LTE decision point may be fixed relative to the subframe boundary.

Another example embodiment relates to non-transitory computer readable medium including instructions stored thereon, which when executed by one or more processor(s) of a wireless communication device, cause the device to perform operations of determining, by a Bluetooth device or interface in the wireless communication device, flexibility of a Bluetooth signal, receiving, by the Bluetooth device or interface, from a LTE device or interface in the wireless communication device, LTE information including information relating to a LTE frame structure, a LTE Downlink or Uplink frame or subframe boundary, or a LTE decision point, and scheduling, based at least in part on the LTE information, the Bluetooth signal. The LTE information may include information relating to a LTE frame structure, a LTE Downlink or Uplink frame or subframe boundary, a LTE inactivity duration, and a LTE decision point. The Bluetooth device or interface and the LTE device or interface may communicate via a Mobile Wireless Standards (MWS) Coex transport interface. The LTE information may include Real Time (RT) and Non Real Time (NRT) messages. The LTE frame structure may be semi-static and the information relating to the LTE frame structure may be conveyed over a NRT coexistence interface. The information relating to the LTE Downlink or Uplink frame or subframe boundary may be conveyed over a RT coexistence interface. The LTE decision point may be fixed relative to the subframe boundary.

What is claimed is:

1. A method for dynamic Bluetooth scheduling, the method comprising the steps of:
   determining, by a Bluetooth device or interface, flexibility of a Bluetooth signal;
   receiving, by the Bluetooth device or interface, from a Long Term Evolution (LTE) device or interface, LTE information comprising information relating to a LTE frame structure and an LTE decision point, wherein the LTE frame structure is semi-static and the information relating to the LTE frame structure is conveyed over a Non Real Time (NRT) coexistence interface, and wherein the LTE decision point comprises a notification point for the LTE device to convey one or more messages responsive to a traffic state change; and
   scheduling, based at least in part on the LTE information, the Bluetooth signal.

2. The method of claim 1, wherein the LTE information further comprises information relating to a LTE inactivity duration.

3. The method of claim 1, wherein the Bluetooth device or interface and the LTE device or interface communicate via a Mobile Wireless Standards (MWS) Coex transport interface.

4. The method of claim 1, wherein the LTE information comprises Real Time (RT) and Non Real Time (NRT) messages.

5. The method of claim 1, wherein the LTE decision point is fixed relative to a subframe boundary.

6. A wireless communication device comprising:
   a Bluetooth device or interface for sending and receiving one or more Bluetooth signals; and
   a Long Term Evolution (LTE) device or interface for sending and receiving one or more LTE signals;
   the Bluetooth device or interface configured to receive, from the LTE device or interface, LTE information comprising information relating to a LTE frame structure and an LTE decision point, wherein the LTE frame structure is semi-static and the information relating to the LTE frame structure is conveyed over a Non Real Time (NRT) coexistence interface, and wherein the LTE decision point comprises a notification point for the LTE device to convey one or more messages responsive to a traffic state change; and
   to schedule the one or more Bluetooth signals based at least in part on the LTE information.

7. The wireless communication device of claim 6, wherein the LTE information further comprises information relating to a LTE inactivity duration.

8. The wireless communication device of claim 6, wherein the Bluetooth device or interface and the LTE device or interface communicate via a Mobile Wireless Standards (MWS) Coex transport interface.

9. The wireless communication device of claim 6, wherein the LTE information comprises Real Time (RT) and Non Real Time (NRT) messages.

10. The wireless communication device of claim 6, wherein the LTE decision point is fixed relative to a subframe boundary.

11. A non-transitory computer readable medium including instructions stored thereon, which when executed by one or more processor(s) of a wireless communication device, cause the device to perform operations of:
   determining, by a Bluetooth device or interface in the wireless communication device, flexibility of a Bluetooth signal;
   receiving, by the Bluetooth device or interface, from a Long Term Evolution (LTE) device or interface in the wireless communication device, LTE information comprising information relating to a LTE frame structure and an LTE decision point, wherein the LTE frame structure is semi-static and the information relating to the LTE frame structure is conveyed over a Non Real Time (NRT) coexistence interface, and wherein the LTE decision point comprises a notification point for the LTE device to convey one or more messages responsive to a traffic state change; and
   scheduling, based at least in part on the LTE information, the Bluetooth signal.

12. The computer readable medium of claim 11, wherein the LTE information further comprises information relating to a LTE inactivity duration.

13. The computer readable medium of claim 11, wherein the Bluetooth device or interface and the LTE device or interface communicate via a Mobile Wireless Standards (MWS) Coex transport interface.

14. The computer readable medium of claim 11, wherein the LTE information comprises Real Time (RT) and Non Real Time (NRT) messages.

15. The computer readable medium of claim 11, wherein the LTE decision point is fixed relative to a subframe boundary.

* * * * *